US011870189B2

(12) United States Patent
De Cloet et al.

(10) Patent No.: US 11,870,189 B2
(45) Date of Patent: Jan. 9, 2024

(54) ELECTRICAL FERRULE, ELECTRICAL CONNECTING DEVICE AND ELECTRICAL CONNECTOR

(71) Applicant: TE Connectivity Germany GmbH, Bensheim (DE)

(72) Inventors: Olivier De Cloet, Bensheim (DE); Joerg Bieber, Bensheim (DE); Christian Mandel, Bensheim (DE); Christian Rusch, Bensheim (DE); Bert Bergner, Bensheim (DE)

(73) Assignee: TE Connectivity Germany Gmbh, Bensheim (DE)

(*) Notice: Subject to any disclaimer, the term of this patent is extended or adjusted under 35 U.S.C. 154(b) by 0 days.

(21) Appl. No.: 17/383,939

(22) Filed: Jul. 23, 2021

(65) Prior Publication Data

US 2022/0029364 A1 Jan. 27, 2022

(30) Foreign Application Priority Data

Jul. 24, 2020 (DE) ......................... 102020119626.1

(51) Int. Cl.
*H01R 9/05* (2006.01)
*H01R 24/54* (2011.01)
(Continued)

(52) U.S. Cl.
CPC ............. *H01R 24/54* (2013.01); *H01R 4/185* (2013.01); *H01R 9/0518* (2013.01); *H01R 13/436* (2013.01); *H01R 2103/00* (2013.01)

(58) Field of Classification Search
CPC ........ H01R 24/54; H01R 24/40; H01R 24/38; H01R 4/185; H01R 4/184; H01R 4/183;
(Continued)

(56) References Cited

U.S. PATENT DOCUMENTS 2,283,918 A * 5/1942 Dekome ................ F16C 33/14
384/295
2,762,117 A * 9/1956 Houck .................... F16C 33/14
384/301
(Continued)

FOREIGN PATENT DOCUMENTS

DE 29514146 U1 11/1995
DE 102017217476 A1 * 4/2019 ............. F16B 17/00
(Continued)

OTHER PUBLICATIONS

Extended European Search Report, Application No. 21187479.7-1201, dated Mar. 24, 2022, 11 pages.
(Continued)

*Primary Examiner* — Harshad C Patel
(74) *Attorney, Agent, or Firm* — Barley Snyder

(57) ABSTRACT

An electrical ferrule for an electrical cable comprises a body defining a circumferential center portion connecting a first flank and a second flank, the first and second flanks arranged opposite one another in a radial direction of the ferrule. At least one latch or lock is defined on at least one of the flanks for selectively fixing the flanks together and closing the ferrule in a manner in which a diameter of the ferrule may be varied during its installation onto an electrical cable.

13 Claims, 10 Drawing Sheets

(51) Int. Cl.
*H01R 4/18* (2006.01)
*H01R 13/436* (2006.01)
*H01R 103/00* (2006.01)

(58) Field of Classification Search
CPC ...... H01R 4/18; H01R 9/0512; H01R 9/0518; H01R 9/0503; H01R 9/05; H01R 9/03; H01R 13/436; H01R 13/428; H01R 13/4226; H01R 13/4223; H01R 13/422; H01R 13/42; H01R 13/02
USPC .......................................................... 439/578
See application file for complete search history.

(56) References Cited

U.S. PATENT DOCUMENTS

| | | | | | |
|---|---|---|---|---|---|
| 3,670,298 | A * | 6/1972 | Klumpp, Jr. | H01R 4/184 | 439/877 |
| 3,741,252 | A * | 6/1973 | Williams | F16L 58/00 | 138/110 |
| 4,415,223 | A * | 11/1983 | Asick | H01R 9/0518 | 439/879 |
| 4,458,983 | A | 7/1984 | Roberts | | |
| 4,692,122 | A * | 9/1987 | Montalbano | H01R 4/184 | 29/863 |
| 4,907,626 | A * | 3/1990 | Mori | F16C 33/046 | 138/156 |
| 5,150,503 | A * | 9/1992 | Muller | F16B 2/08 | 29/521 |
| 5,165,816 | A * | 11/1992 | Parasin | F16B 5/0012 | 52/592.4 |
| 3,237,905 | A | 3/1996 | Baker et al. | | |
| 5,965,847 | A * | 10/1999 | Tanaka | H01R 9/0518 | 439/607.07 |
| 6,101,778 | A * | 8/2000 | Mårtensson | E04F 15/02 | 52/592.1 |
| 6,142,923 | A * | 11/2000 | Bakoledis | B31B 50/00 | 492/30 |
| 6,421,886 | B1 * | 7/2002 | Oetiker | F16L 33/02 | 24/23 R |
| 6,511,380 | B1 * | 1/2003 | Oetiker | F16J 3/042 | 464/175 |
| 6,685,381 | B1 * | 2/2004 | Sugita | B60G 9/00 | 280/124.152 |
| 7,011,482 | B2 * | 3/2006 | Underwood | F16B 43/006 | 411/539 |
| 7,160,150 | B2 * | 1/2007 | Annequin | H01R 43/048 | 439/585 |
| 7,422,480 | B1 * | 9/2008 | Musick | H01R 4/183 | 439/877 |
| 9,395,500 | B2 | 7/2016 | Zimmel | | |
| 9,869,349 | B2 * | 1/2018 | Rittmann | F16C 33/128 | |
| 10,008,786 | B2 * | 6/2018 | Brantingham | H01R 13/193 | |
| 10,082,165 | B2 * | 9/2018 | Deisinger | F16B 2/08 | |
| 10,119,588 | B2 * | 11/2018 | Kuroi | F16F 1/3842 | |
| 10,199,780 | B2 * | 2/2019 | Volkmann | H01R 4/184 | |
| 10,267,344 | B2 * | 4/2019 | Widrig | F16L 33/02 | |
| 10,497,492 | B2 | 12/2019 | Miyamoto et al. | | |
| 10,992,087 | B2 * | 4/2021 | Hoyack | H01R 4/2495 | |
| 11,286,986 | B2 * | 3/2022 | Dimartino | F16C 33/1095 | |
| 11,316,289 | B2 | 4/2022 | Schrettlinger et al. | | |
| 11,362,466 | B2 * | 6/2022 | Droesbeke | H01R 13/6592 | |
| 2006/0057904 | A1 * | 3/2006 | Sakaguchi | H01R 4/185 | 439/877 |
| 2007/0029792 | A1 * | 2/2007 | Andre | G06F 16/40 | 285/23 |
| 2015/0255886 | A1 * | 9/2015 | Schmidt | H01R 4/183 | 439/877 |
| 2019/0097330 | A1 * | 3/2019 | Bergner | H01R 4/18 | |
| 2022/0029364 | A1 * | 1/2022 | De Cloet | H01R 24/54 | |
| 2022/0029371 | A1 * | 1/2022 | De Cloet | H01R 9/0518 | |

FOREIGN PATENT DOCUMENTS

| | | | |
|---|---|---|---|
| EP | 3203586 | A1 | 8/2017 |
| JP | 2005353334 | A | 12/2005 |
| JP | 2006269248 | A | 10/2006 |
| JP | 2007141753 | A | 6/2007 |
| JP | 2012048837 | A | 3/2012 |
| JP | 2017126551 | A1 | 7/2017 |
| JP | 2017228385 | A | 12/2017 |
| JP | 2018200835 | A | 12/2018 |
| JP | 2020535606 | A | 12/2020 |
| WO | 2019063641 | A1 | 4/2019 |

OTHER PUBLICATIONS

Japanese Office Action corresponding to Application No. 2021-118667, dated Aug. 30, 2022 and English translation thereof, 9 pages.

* cited by examiner

ELECTRICAL FERRULE, ELECTRICAL CONNECTING DEVICE AND ELECTRICAL CONNECTOR

CROSS-REFERENCE TO RELATED APPLICATIONS

This application claims priority under 35 U.S.C. § 119 to German Patent Application No. 102020119626.1 filed on Jul. 24, 2020, the entire disclosure of which is incorporated herein by reference.

FIELD OF THE INVENTION

The present disclosure relates to electrical connectors, and more particularly, to a ferrule for use with a high frequency (HF) electrical connector.

BACKGROUND

Modern electrical connectors must ensure faultless transmission of electricity and electrical signals in today's high-demand applications. As a result, efforts are continually being made to improve the performance, reliability and efficiency of these connectors, as well as to lower their cost. High frequency (HF) data connectors (i.e., connectors used in applications with transmission frequencies greater than 3 MHz) pose unique challenges, as each component of the connector can significantly influence connector performance as a result of the wave properties of electricity. By way of example, a ferrule or supporting sleeve of an HF connector has a significant influence on an impedance of the final connector or connector assembly.

Conventional ferrules of a given type are only intended for use with a single type of cable, for example with a cable from the same manufacturer, or a cable of a particular size (e.g., the diameter of its inner layers). For other cable types or cable sizes, other types of ferrules must be used. Further, the diameter of a given cable can vary undesirably during a cable connectorization process. This change in diameter may be a result of at least one mechanical property of the cable (e.g., finish, hardness, compressibility, elasticity), and in particular of its inner insulating layer(s). Similar problems occur as cables of the same diameter from different manufacturers often have different mechanical properties, and cables from a given manufacturer can have varying dimensional tolerances. As a result of each of these conditions, manufacturing is made more difficult as a variety of ferrules need to be accessible for accommodating varying cable characteristics. Moreover, in the case of cables with changing diameters and/or varying tolerances, an ideal fit is often not achievable even with a variety of ferrules available.

Accordingly, there as need for improved HF-suitable electrical ferrules and associated connectors which address the above-described drawbacks of conventional ferrules.

SUMMARY

An electrical ferrule according to an embodiment of the present disclosure comprises a body defining a circumferential center portion connecting a first flank and a second flank, the first and second flanks are arranged opposite one another in a radial direction of the ferrule. At least one latch or lock is defined on at least one of the flanks for selectively fixing the flanks together and closing the ferrule in a manner in which a diameter of the ferrule may be varied during its installation onto an electrical cable.

BRIEF DESCRIPTION OF THE DRAWINGS

The invention will now be described by way of example with reference to the accompanying Figures, of which.

DETAILED DESCRIPTION OF THE EMBODIMENTS

Figure 1:
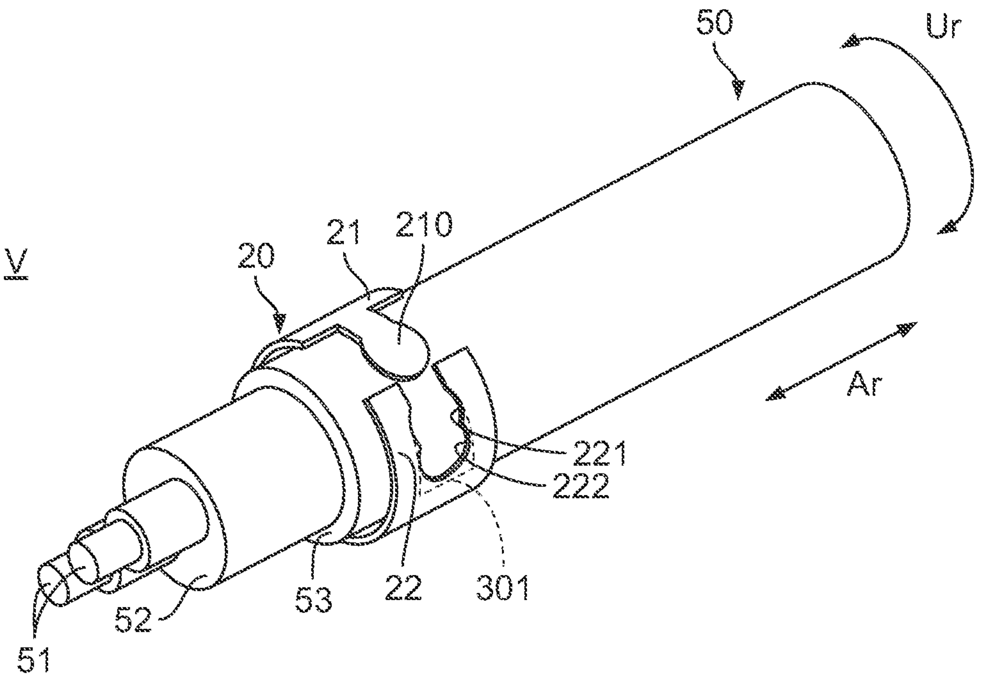
FIG. 1 is a perspective view of an embodiment of an electrical ferrule according to the invention that is variable in its mounting diameter in a premounted state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
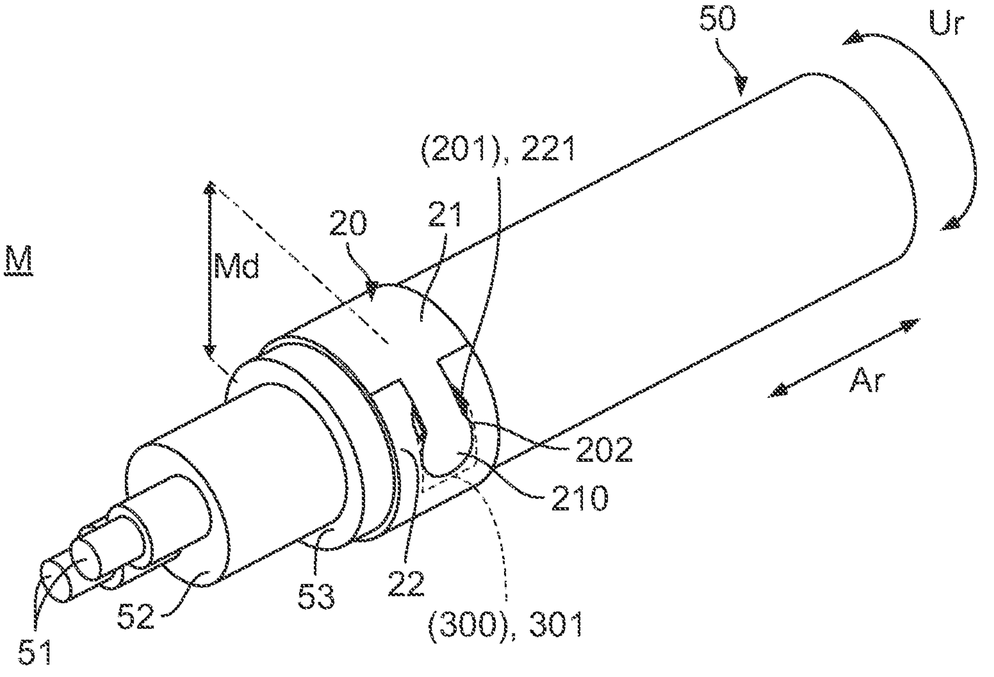
FIG. 2 a perspective view of the embodiment of FIG. 1 is a mounting state.
Figure 3:
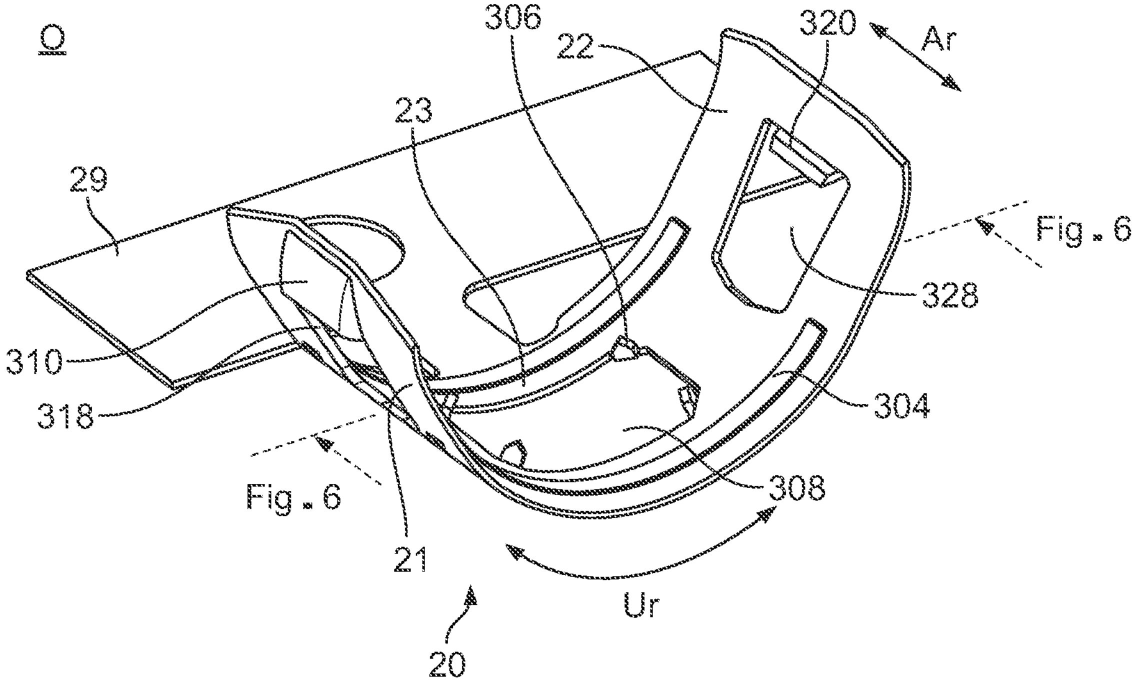
FIG. 3 is a perspective view of an embodiment of a ferrule that is variable in its mounting diameter in its open state.
Figure 4:
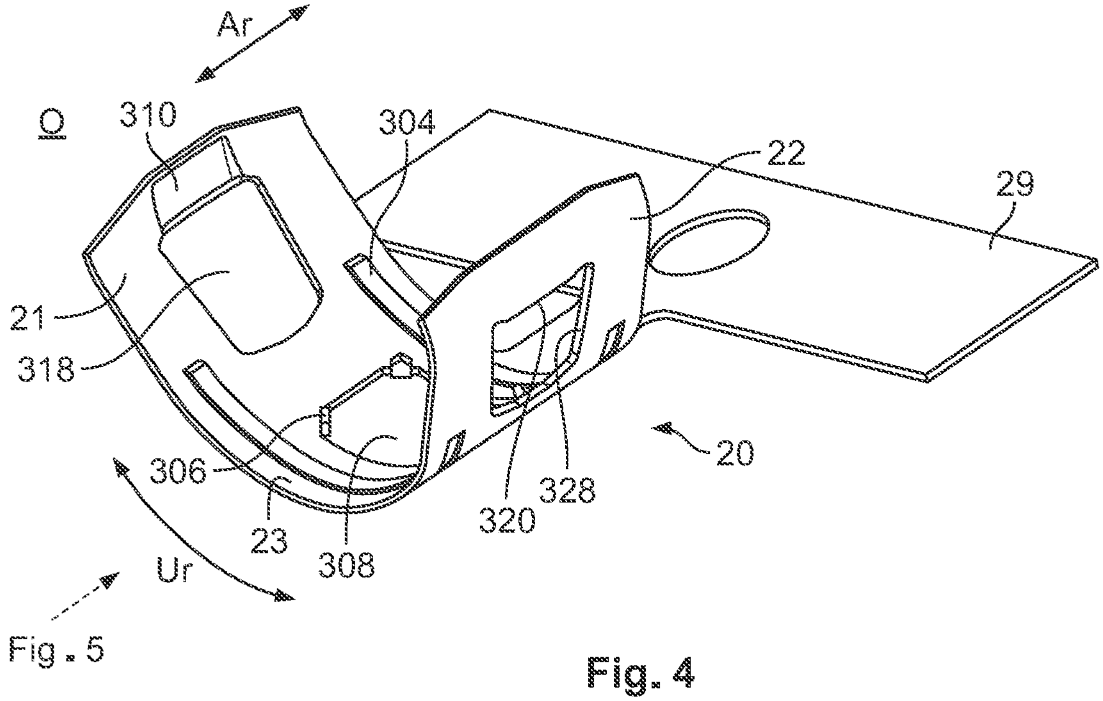
FIG. 4 is a perspective view of an embodiment of a ferrule that is variable in its mounting diameter in its open state.
Figure 5:
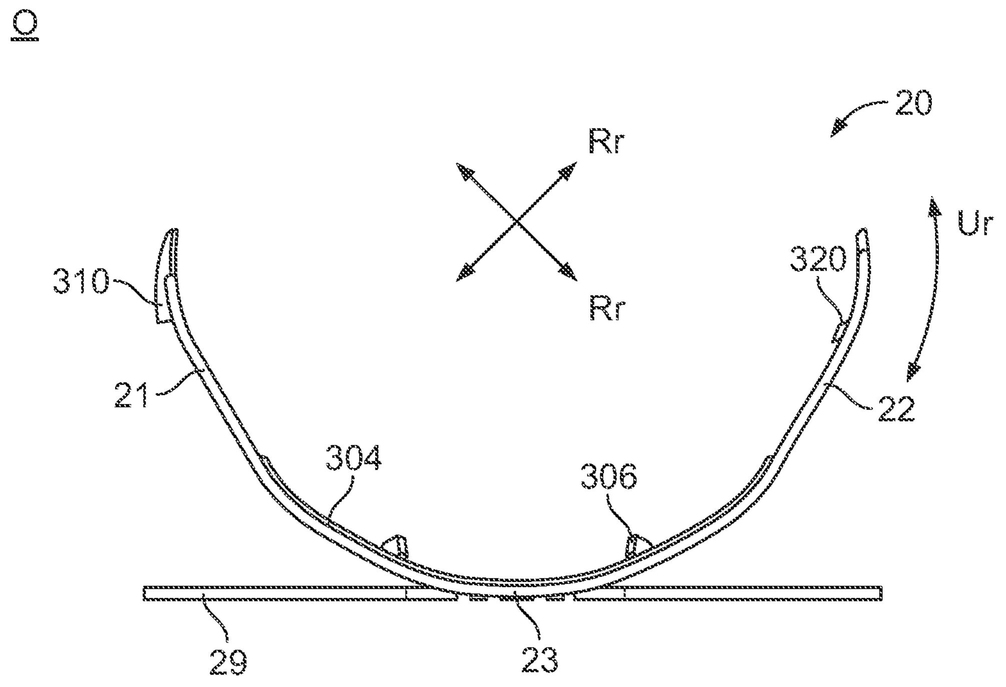
FIG. 5 is a side view of the ferrule of FIGS. 3 and 4 in the open state.
Figure 6:
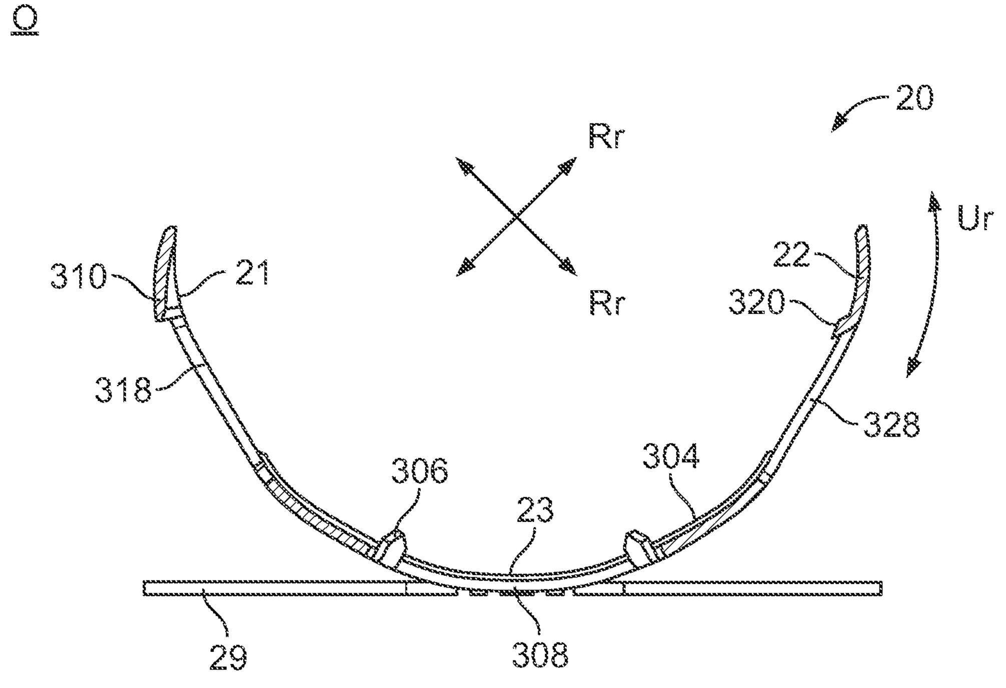
FIG. 6 is a section view of the ferrule of FIGS. 3 and 4 in the open state.
Figure 7:
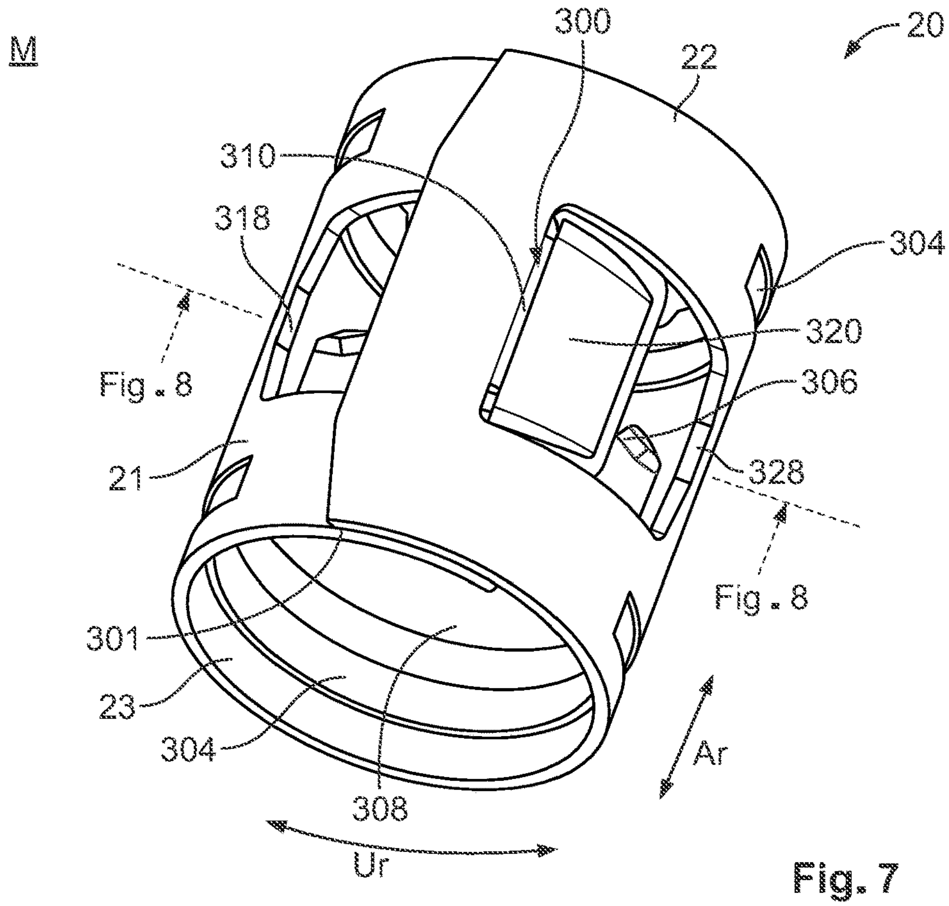
FIG. 7 is a perspective view of the ferrule according to the invention in its mounting state without a cable.
Figure 8:
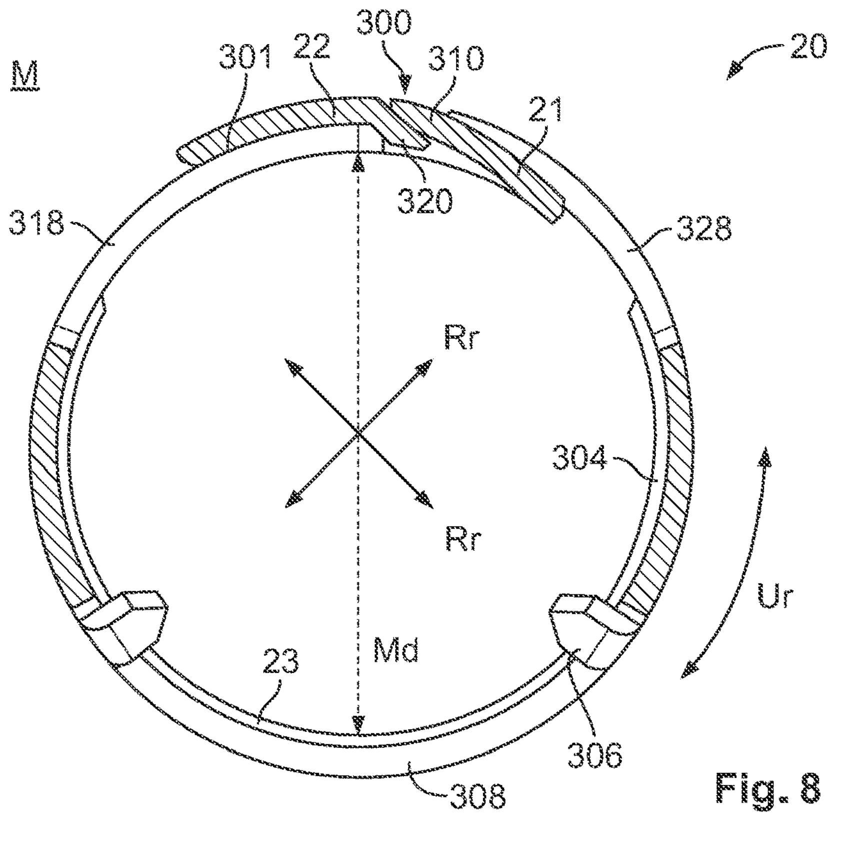
FIG. 8 is a front section view of the ferrule according to the invention in its mounting state without a cable.
Figure 9:
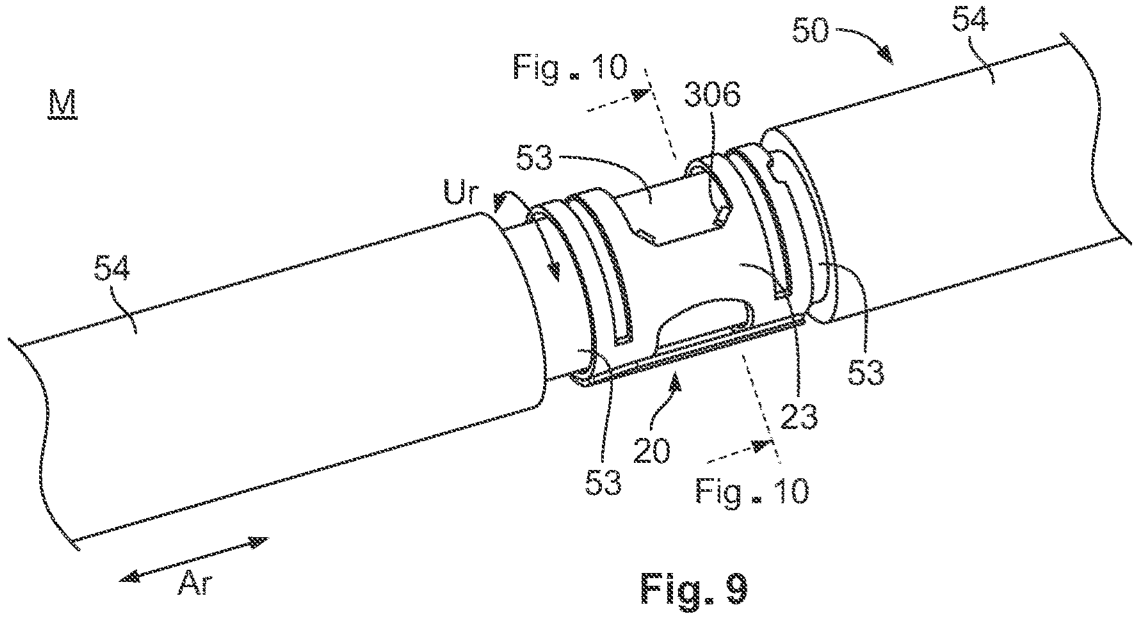
FIG. 9 is a perspective view of the ferrule according to the invention in its mounting state with a cable.
Figure 10:
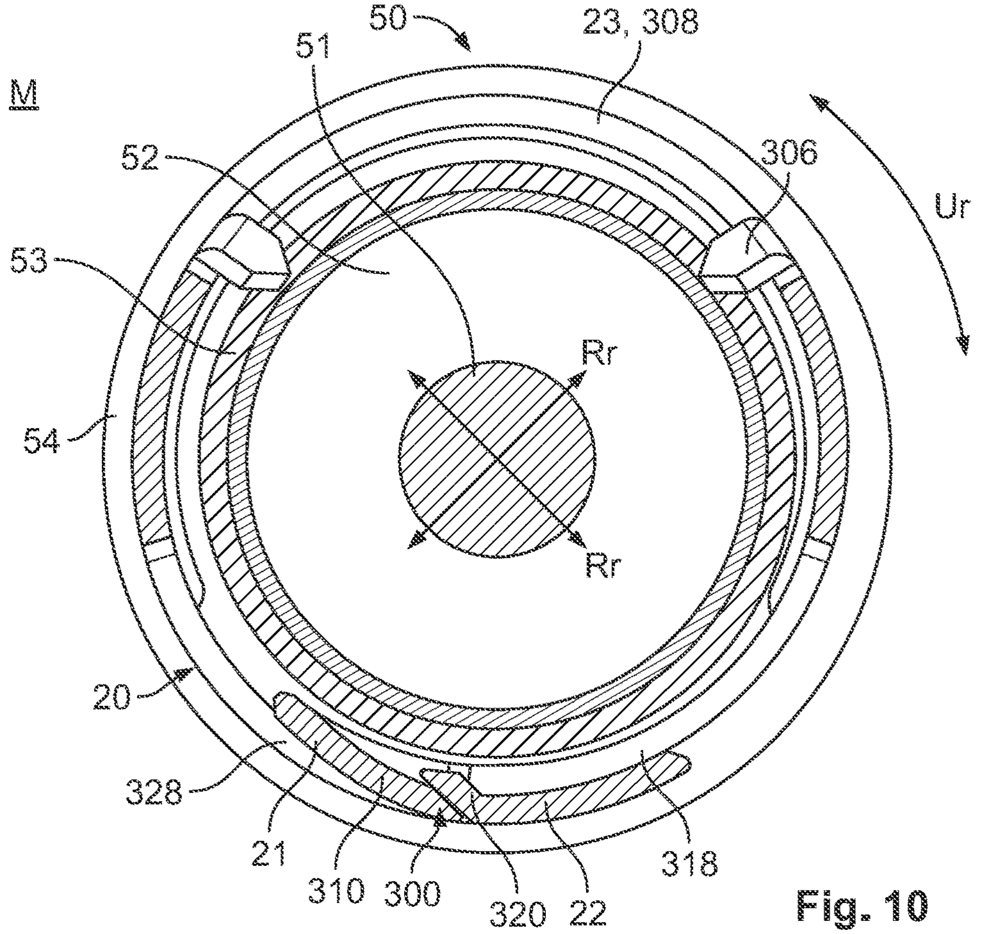
FIG. 10 is a section view of the ferrule according to the invention in its mounting state with a cable.
Figure 11:
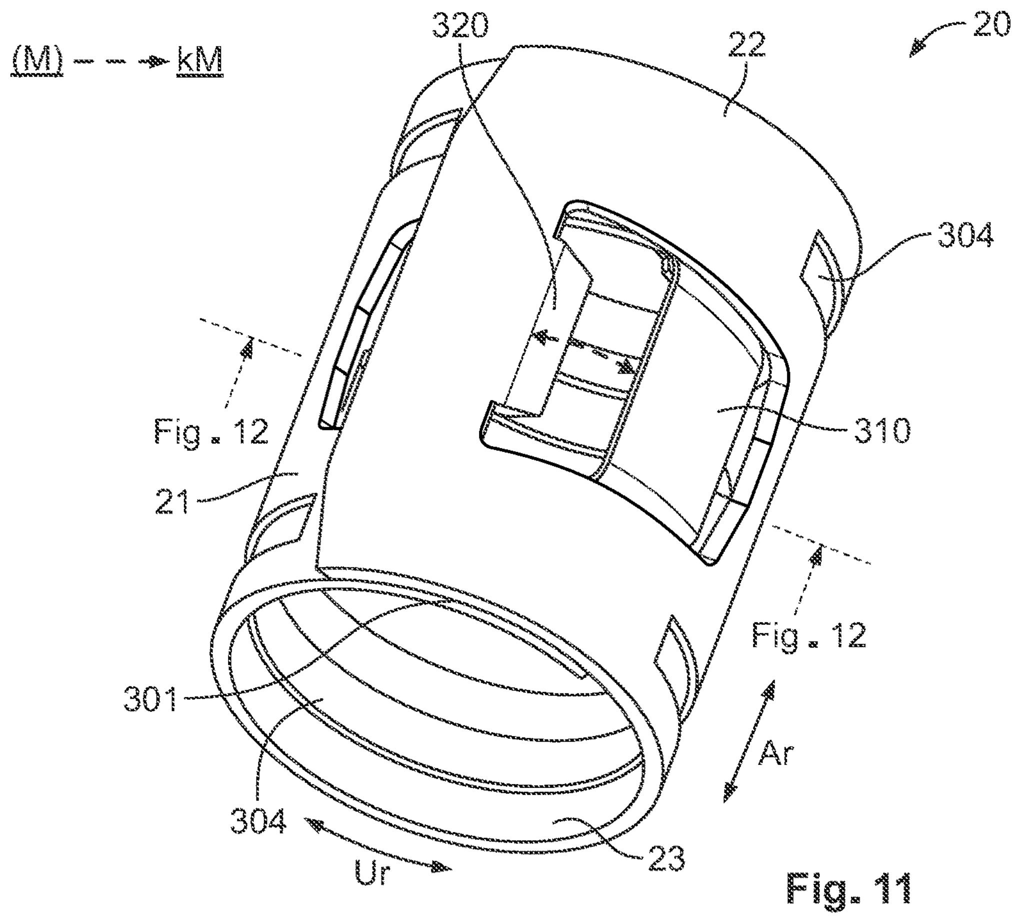
FIG. 11 is a perspective view of the ferrule according to the invention in its compressed mounting state without a cable.
Figure 12:
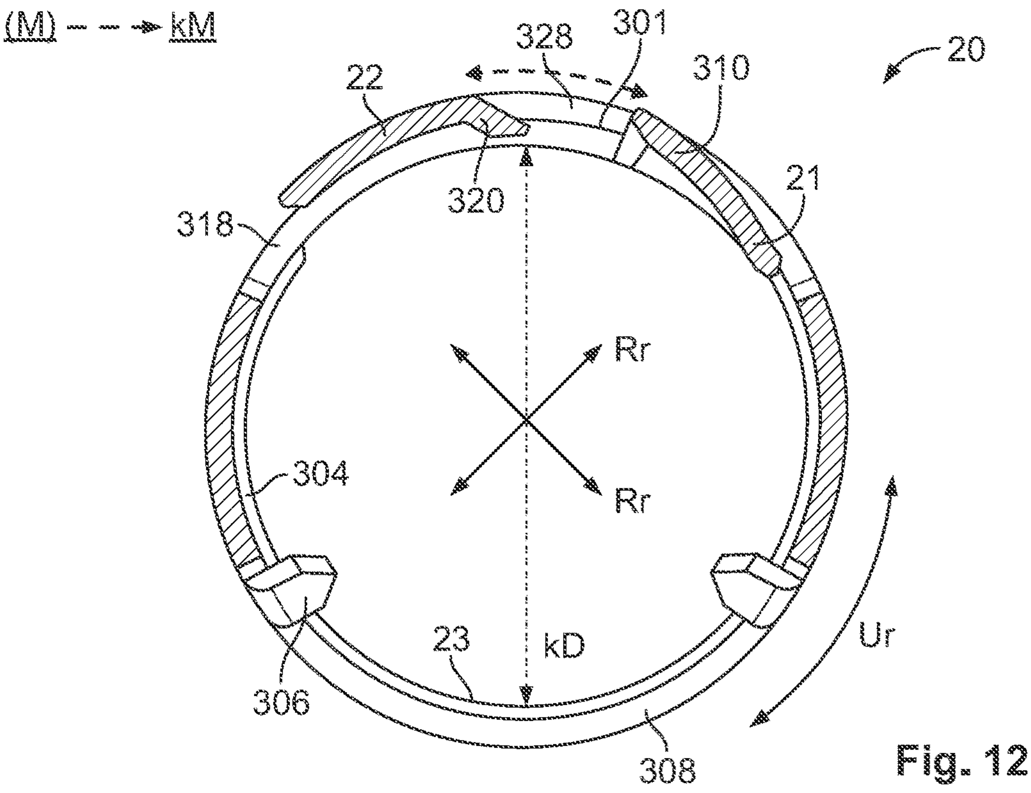
FIG. 12 is a front section view of the ferrule according to the invention in its compressed mounting state without a cable.

Ferrules according to embodiments of the present disclosure are adapted to be used with cables of different diameters and/or be able to adapt themselves to a changing diameter of a cable during a cable assembly or preassembly process. Embodiments of the present disclosure are explained in detail with reference to two exemplary embodiments or variants (variant one: FIGS. 1 and 2, variant two: FIGS. 3-19) of an electrical ferrule, in particular an HF ferrule 20, for an electrical connecting device, in particular an HF data connecting device 1. Although the invention is more specifically described and illustrated in more detail by preferred exemplary embodiments, the invention is not restricted by the exemplary embodiments disclosed.

Other variations can be derived from this and/or from the above without departing from the scope of protection of the invention. The invention can be used generally in the electrical sector in the case of an electrical entity. Only those spatial portions of a subject of the invention that are necessary for an understanding of the invention are shown in the drawing. Terms such as connector and mating connector, terminal and mating terminal, etc. should be interpreted as mutually interchangeable.

Figure 13:
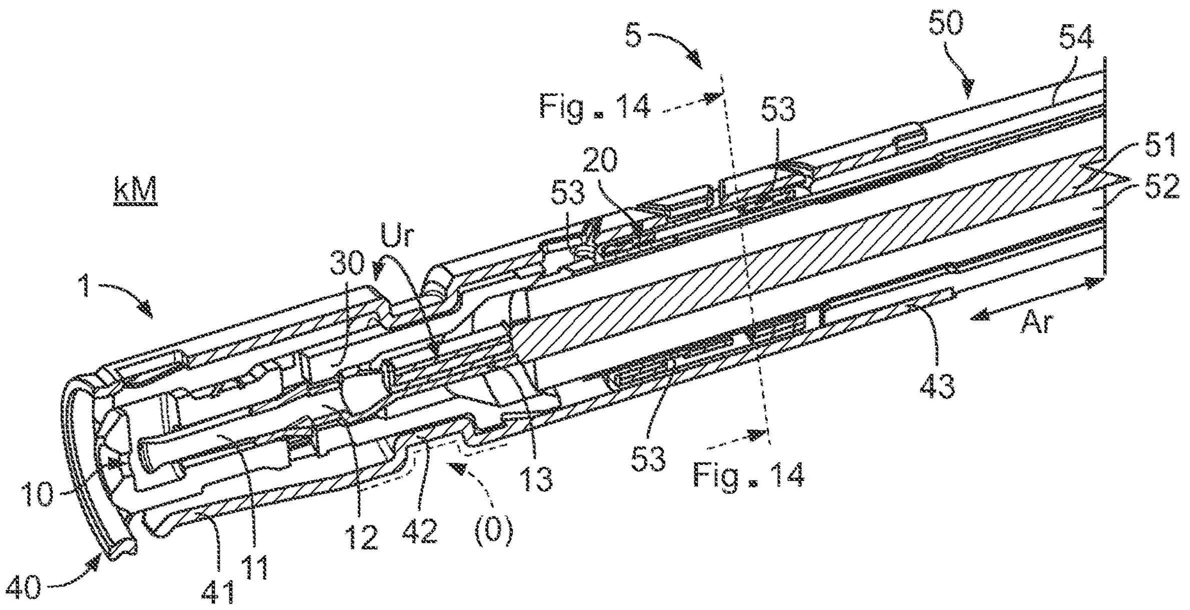
FIG. 13 is a side sectional view of a connector including the ferrule according to the invention in its compressed mounting state on a cable.
Figure 14:
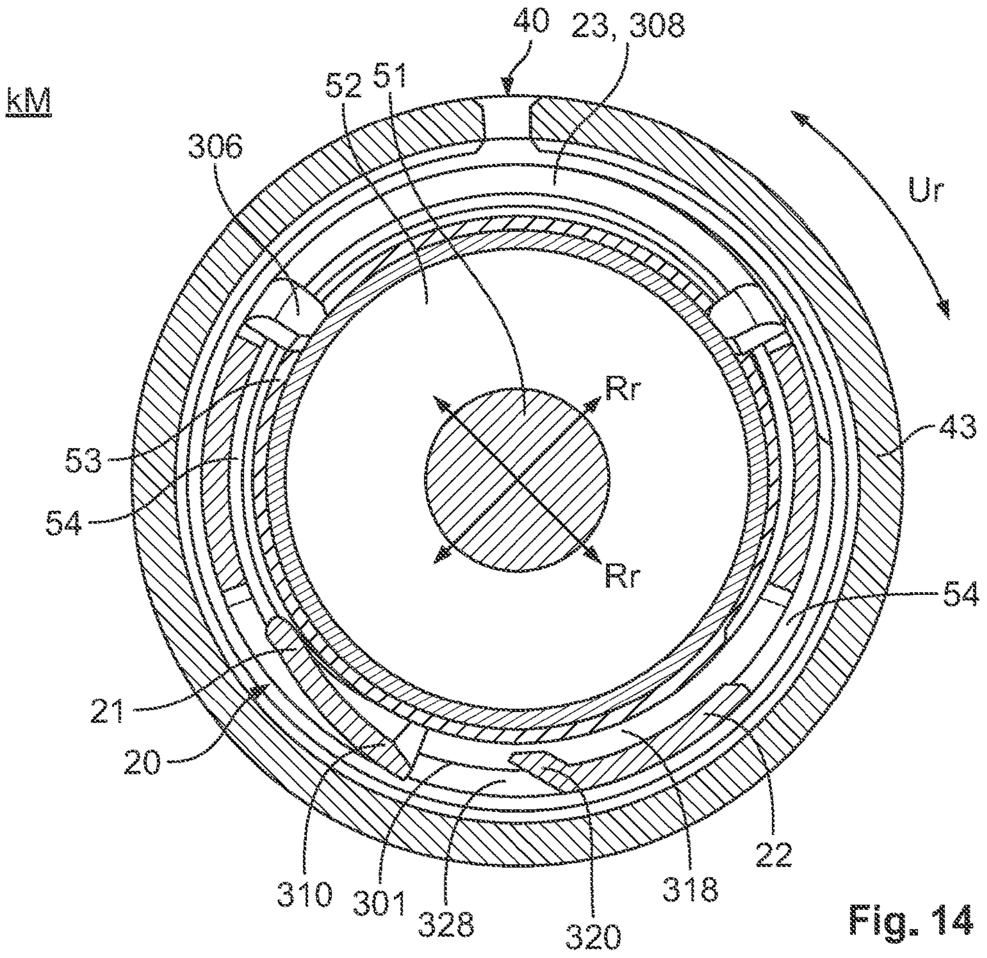
FIG. 14 is a front sectional view of the connector and the ferrule according to the invention in its compressed mounting state on a cable.
Figure 15:
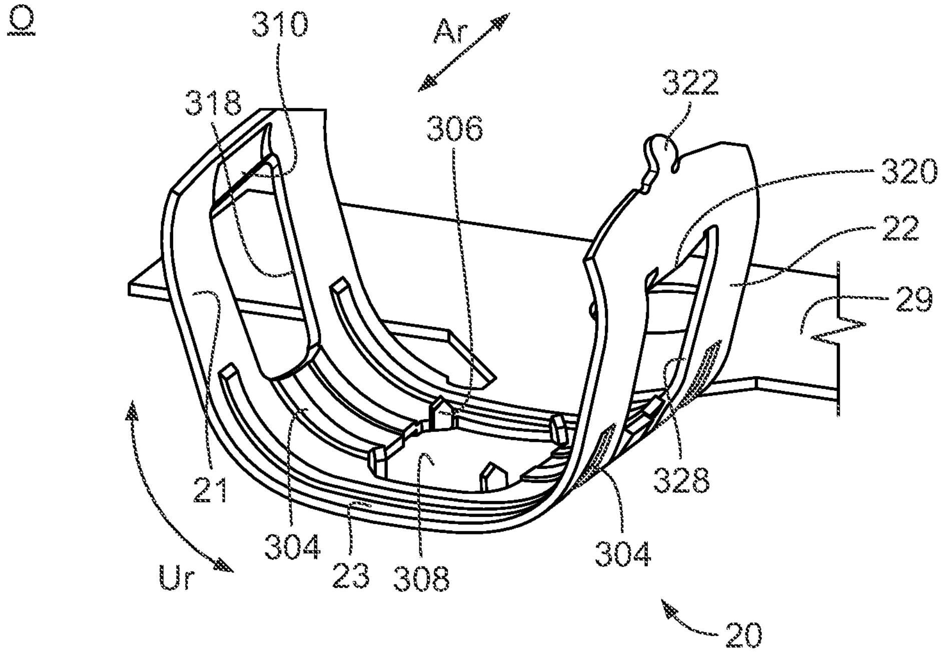
FIG. 15 is a perspective view of a ferrule according to another embodiment of the invention.
Figure 16:
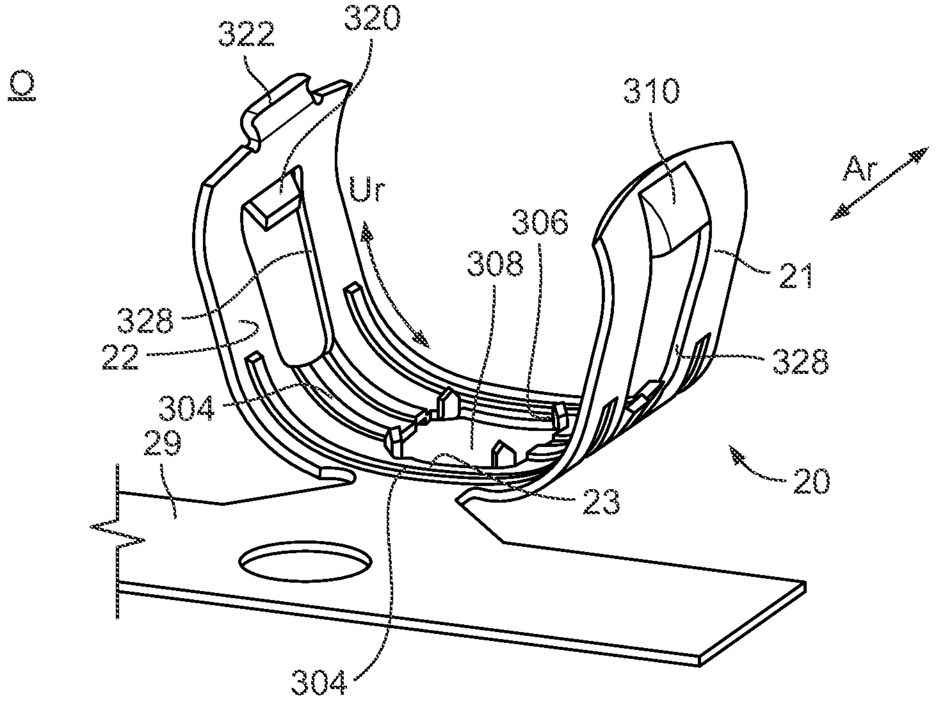
FIG. 16 is a perspective view of a ferrule according to another embodiment of the invention.
Figure 17:
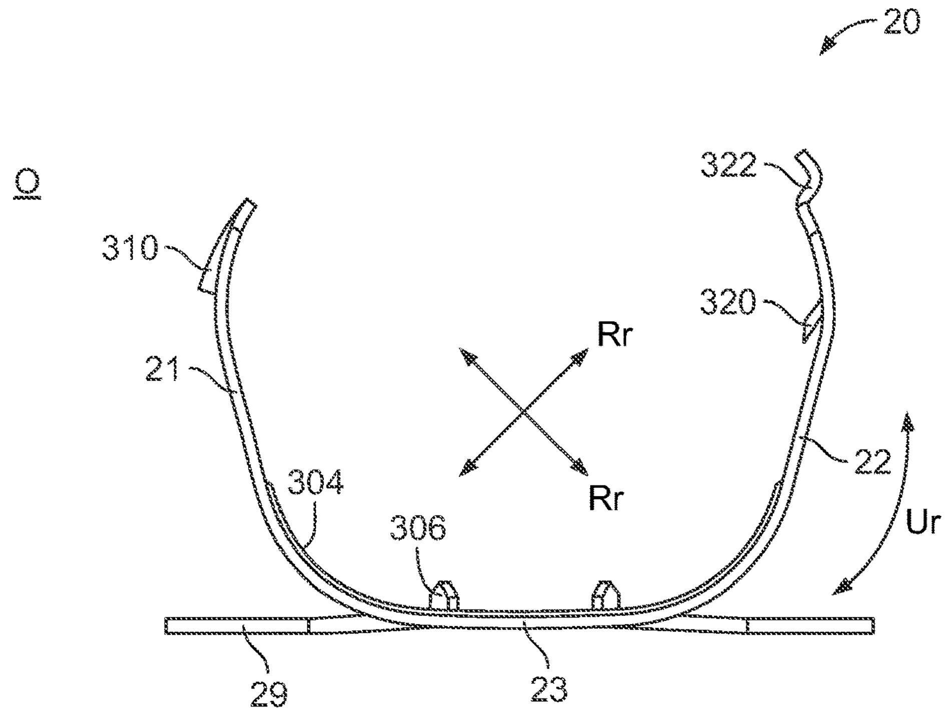
FIG. 17 is a front view of the ferrule according to the invention in an open state.

The exemplary connecting device 1 shown in FIG. 13 comprises a first or inner electrical terminal 10, the electrical ferrule 20, a second or outer electrical terminal 40 and a dielectric 30 between the inner terminal 10 and the outer terminal 40. The terminal 10 may be formed as a male or female terminal 10 and/or the terminal 40 may be formed as a shielding contact sleeve 40. Other forms of the connecting device 1 are possible without departing from the scope of the present disclosure.

The connecting device 1 can be mounted or is mounted on an electrical cable, in particular an HF cable 50 (electrical entity 5, in particular HF entity 5, as a preassembled electrical cable 5). The cable 50 may be formed as a twinaxial cable as shown in FIGS. 1 and 2, or a coaxial cable as shown in FIGS. 9, 10, 13 and 14. In the exemplary embodiment, the cable 50 has at least one central inner conductor 51, an inner insulation 52, an outer conductor 53 and a protective sheath 54. Other configurations of the cable 50 can of course be used. The connecting device 1 may be mounted in an electrical connector 0 (indicated in FIG. 13 by dashed lines), in particular an HF connector 0, preferably an HF data connector 0, such as a twinaxial connector 0, a coaxial connector 0, etc., for example in its connector housing.

Still referring to FIG. 13, the first or inner terminal 10 comprises an electromechanical contact portion 11, a mechanical fastening portion 12 and an electromechanical crimping portion 13. Furthermore, the second or outer terminal 40 comprises an electromechanical contact portion 41, a mechanical fastening portion 42 and an electromechanical crimping portion 43. The ferrule 20 may be formed as a crimpable or non-crimpable ferrule, which preferably can be mounted radially on the outer conductor 53, in particular a shielding conductor 53 of the cable 50 and radially under the outer terminal 40, in particular the shielding contact sleeve 40.

The ferrule 20 has in its circumferential direction Ur a circumferential center portion 23 and peripherally on both sides thereof an end or flank 21, 22, which may be formed as crimping flanks 21, 22. The cross section of the ferrule 20 is substantially u-shaped or substantially v-shaped in its open state O (see FIGS. 3 to 5) and/or its premounting state V (first variant) on the cable 50 (see FIG. 1), and/or substantially o-shaped in its mounting state M on the cable 50 (see FIGS. 2 and 7-10) and/or its compressed mounting state kM (second variant) on the cable 50 (see FIGS. 11-14). The ferrule 20 extends substantially only in an axial direction Ar. More specifically, apart from a material thickness of the ferrule 20, and comparatively small devices or elements (304, 306, 308, 310, 318, 320, 328) extending in a radial direction Rr of the ferrule, the ferrule preferably does not have a portion extending in the radial direction.

According to embodiments of the present disclosure, the ferrule 20 defines at least one self-lock or self-locking 201, 202 (first variant) or 300 (second variant) in the circumferential direction Ur. The self-locking 201, 202, 300 is provided to limit relative movement between the ends or flanks of the ferrule 20 to only one circumferential direction Ur (second variant, preferably a single lock or self-locking 300) or in both circumferential directions Ur (first variant, preferably at least two self-lockings 201, 202), i.e. prevent an intrinsic movement of the ferrule in at least one (i.e., one or both) of the circumferential directions Ur.

The ferrule 20 provides for a varying mounting diameter Md (both variants), kD (second variant) for a mounting state M (both variants), kM (second variant) on the cable 50. Specifically, the ferrule 20 includes two free longitudinal end portions of the flanks 21, 22 that lie opposite one another in the circumferential direction Ur and which may engage in one another in the circumferential direction Ur (first variant) or be arranged one over the other in the radial direction Rr (second variant), and possibly engage radially into one another. The first variant of the invention is suitable for different cable diameters, while the second variant of the invention can be used for a cable diameter that changes during an assembly process of the cable 50.

FIGS. 1 and 2 show a premounting state V and a final mounting state M of the ferrule 20 according to the first embodiment, respectively. The ferrule 20 is shown in use on the electrical twinaxial cable 50 for a twinaxial connecting device 1 (analogous to FIG. 13). It is of course possible to use the first variant for another cable, such as for the coaxial cable 50 shown in FIGS. 3-14, by way of example. The ferrule 20 has two self-lockings 201, 202 adapting the ferrule to two different mounting diameters Md (or cable diameters). Of course, the ferrule 20 may also have more than two self-lockings 201, 202 for a corresponding plurality of mounting diameters Md.

The mounting diameters Md of the ferrule 20 can be set up successively in the circumferential direction Ur, for which a first flank 21 has a single latching means 210, preferably formed as a latching projection 210, and a second flank 22 has a corresponding plurality of latching means 221, 222, preferably formed as first and second latching recesses 221, 222. The latching recesses 221, 222 are preferably formed in the flank 22 at the same axial position, with one behind the other in the circumferential direction Ur. In the exemplary embodiment, the first latching recess 221 merges seamlessly into the second latching recess 222. The two latching recesses 221, 222 are preferably formed substantially the same.

The latching projection 210 is formed in a round or mushroom-shaped manner, with the latching recesses 221, 222 formed with a complementary round or oval shape. Other forms of the latching projection 210 and the latching recesses 221, 222 that at least partly complement one another can be used. In the possible mounting states M (two in the exemplary embodiment), the latching projection 210 fills in the respective latching recess 221, 222 substantially completely.

FIGS. 3-19 show an embodiment of the second variant of the electrical ferrule 20 in use on the electrical coaxial cable 50 for the coaxial connecting device 1. It is of course possible to use the second variant on another cable, such as for example a twinaxial cable 50 (see FIGS. 1 and 2). More specifically, FIGS. 3-6 show the ferrule 20 in its open state O, FIGS. 7-10 show the ferrule 20 in its crimped mounting state M, and FIGS. 11-14 show the ferrule 20 in its over-crimped and compressed mounting state kM. FIGS. 15-19 show further embodiments of the invention.

The ferrule 20 is preferably formed as a crimp ferrule 20, which is first crimped onto the cable 50. At a time thereafter, possibly after turning over a free end portion of the outer conductor 53 of the cable 50 onto it, a shielding contact sleeve 40 is crimped onto the cable 50 and the ferrule 20. Specifically, during mounting of a connecting device 1 on the cable 50, the ferrule 20 is first crimped and then over-crimped with the shielding contact sleeve 40. Initially, in the mounting state M, the ferrule 20 on the cable 50 has a comparatively large mounting diameter Md. After the over-crimping, in the compressed mounting state kM, the ferrule 20 has a comparatively small compressed mounting diameter kD, as the ferrule 20 has been compressed in the radial direction Rr by the over-crimping.

In order to mount the ferrule 20 on the cable 50 (mounting state M) such that it can be compressed in the radial direction Rr on the cable 50 (compressed mounting state kM), the ferrule 20 has a single self-locking 300, which in addition also only acts in a single circumferential direction Ur, i.e., against opening of the ferrule in the direction of its open state O. Specifically, in the mounting state M the ferrule 20 is fixed on the cable 50 with its mounting diameter Md substantially not increasable. However, the ferrule 20 diameter can still be reduced to the compressed mounting diameter kD for the compressed mounting state kM on the cable 50.

More specifically, the first flank 21 comprises a latching means 310 formed as an outer hook 310 extending from the ferrule 20 in the radial direction Rr. Furthermore, the second flank 22 comprises a latching means 320 formed as an inner hook 320 projecting into the ferrule 20 in the radial direction Rr. As the latching means 310, 320 can lock on one side, the ferrule 20 can be formed (premounting state V) or is formed in a double-layered manner in a circumferential portion in the mounting state M and in the compressed mounting state kM.

The outer hook 310 may be formed as a circumferential lug 310 extending tangentially and radially outwards from a curved plane of the first flank 21. The inner hook 320 may be formed as a radial hook extending tangentially and radially inwards from a curved plane of the second flank 22. In the mounting state M, two circumferential sides of the outer hook 310 and the inner hook 320 corresponding to one another lie against one another preferably in a form-fitting manner (see FIGS. 8 and 9), wherein the plane constituted thereby is preferably not tangent to the ferrule 20 and does not lead through a center of the ferrule 20. The plane cuts out a flat segment from a cross section of the ferrule 20 or a flat cylinder portion from the ferrule 20.

In the mounting state M and in the direction of the compressed mounting state kM in the circumferential direction Ur, an intrinsic freewheel 301 is enabled in the ferrule 20 between the flanks 21, 22. Starting from the mounting state M, the flanks 21, 22 can at first only be displaced in one circumferential direction Ur, specifically the direction of the compressed mounting state kM. The flanks 21, 22 can be moved with respect to one another both in the direction of the compressed mounting state kM and in the direction of the mounting state M. Thus, the intrinsic freewheel 301 is realized as a sliding bearing or circumferential sliding bearing extending in the circumferential direction Ur between the flanks 21, 22.

Further, the ferrule 20 may have in one flank 21, in both flanks 21, 22 and/or in the circumferential center portion 23, at least one impedance compensating means 308, 318, 328 (in particular at least one, for example rectangular, passage 308, 318, 328 as an air slit, air cushion, etc.). In the exemplary embodiment, three such impedance compensating means 308, 318, 328 are formed in the ferrule 20 and are distributed regularly in the circumferential direction Ur.

The impedance compensating means 308 of the circumferential center portion 23 may cover a greater circumferential portion than the respective impedance compensating means 318, 328 in the flanks 21, 22. Preferably, a surface area of the impedance compensating means 308 of the circumferential center portion 23 is substantially the same size as the surface areas of the impedance compensating means 318, 328 of the flanks 21, 22 together, or smaller as a result of the intrinsic covering of the ferrule 20 in the circumferential direction Ur in a region of the flanks 21.

An outer axial edge of the impedance compensating means 318 of the first flank 21 in the open state O and in the circumferential direction Ur forms the radial outer hook or latching means 310. Likewise, an outer edge of the impedance compensating means 328 of the second flank 21 in the open state O and in the circumferential direction Ur forms the radial inner hook or latching means 320. Furthermore, axially before and/or after the impedance compensating means 308, 318, 328, or along the corresponding impedance compensating means 308, 318, 328, the ferrule 20 mat comprise a stiffening bead 304 running in the circumferential direction Ur.

The ferrule 20 may have at least one fixing hook 306 projecting inwards in the radial direction Rr. The fixing hook 306 is formed in the circumferential center portion 23, and more particularly, in a corner section of the impedance compensating means 308 of the circumferential center portion 23. In one embodiment, two or four fixing hooks 306 are defined in the corner sections of the impedance compensating means 308 of the circumferential center portion 23. Other positions, in particular on/in one or both axial outer edges of the ferrule 20, may also be used.

According to the invention, the ferrule 20 may be formed as a non-crimpable, i.e., not plastically deformable, ferrule, but as a preferably only elastically and/or partly plastically deformable spring ferrule. Specifically, the two flanks 21, 22 are formed as spring flanks with respect to one another in the radial direction Rr over the circumferential center portion 23 in the ferrule 20. However, the ferrule 20 can be subject to a crimping process, and consequently can also be referred to as a crimp ferrule. This can be realized in both variants of the invention. Furthermore, a mixed formed between a crimpable ferrule and a spring ferrule may also be used.

Figure 18:
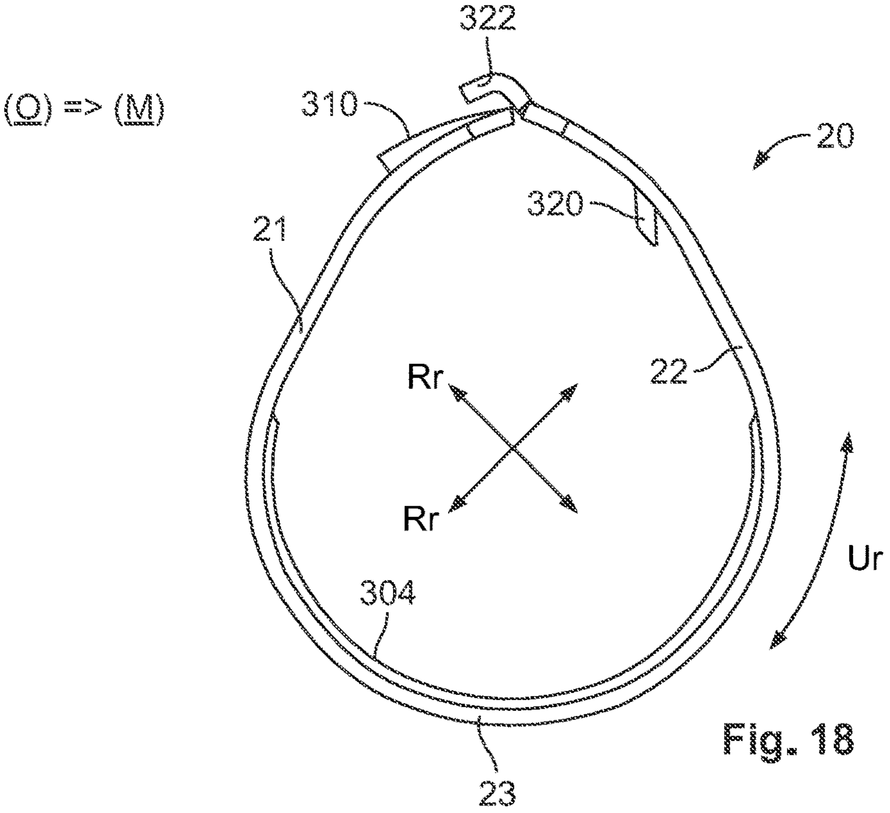
FIG. 18 is a front view of the ferrule according to the invention during mounting.
Figure 19:
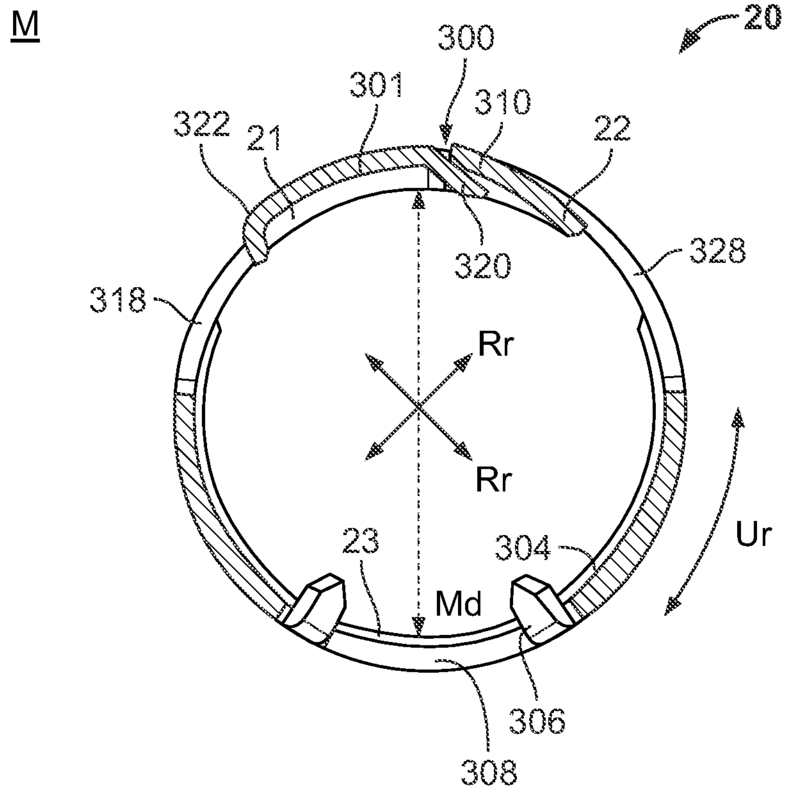
FIG. 19 is a front sectional view of the ferrule according to the invention in a mounted or closed state.

FIGS. 15-19 show three further embodiments of the present disclosure. In contrast to the above embodiments, the ferrule 20 has a cross section which is pot-shaped or u-shaped (open on one side and rounded-rectangular) in its open state O. In the mounting state M as shown in FIG. 19, the ferrule 20 may be formed as substantially circular, elliptical or oval. The ferrule 20 comprises between the impedance compensating means 308, 318 at least one, in particular two, stiffening beads 304 extending in the circumferential direction Ur. The stiffening beads 304 may be present in each embodiment of the present disclosure.

The ferrule 20 of FIGS. 15-19 further comprises an anticollision lug 322 projecting outwards in the circumferential direction Ur on the flank 22 for preventing the free circumferential ends of the flanks 21, 22 from colliding with one another during the crimping of the ferrule 20. The anticollision lug 322 may be formed as a comparatively narrow (FIG. 15) or a comparatively wide (FIG. 16) anticollision lug 322, either of which may be advantageous depending on a design of the ferrule 20 and/or a crimping process to be used. The anticollision lug 322 is provided on the flank 22 on which the inwardly directed latching means 320 is also formed.

In the open state O of the ferrule 20, the anticollision lug 322 (FIG. 17) extends from a circumferential end of the flank 22 in the circumferential direction Ur and possibly in the radial direction Rr. In the exemplary embodiment, in the open state O, the anticollision lug 322 extends at first substantially outwards in the radial direction Rr and following that substantially in the circumferential direction Ur. Further, in the mounting state M, the anticollision lug 322 extends in the opposite direction, specifically at first substantially in the circumferential direction Ur and following that substantially inwards in the radial direction Rr. The radial portion of the anticollision lug 322 rests in the circumferential direction Ur, wherein the circumferential portion of the anticollision lug 322 is bent radially inwards. Other configurations of the anticollision lug 322, such as a ramp, can also be used.

During the crimping of the ferrule 20 (FIG. 18), the anticollision lug 322 is actuated or triggered by a crimping tool, in particular a crimp indentor, in such a way that the anticollision lug 322 presses the first flank 21 radially under the second flank 22. As a result, a beginning freewheel 301 of the ferrule 20 in the circumferential direction Ur, and as a consequence the self-locking 300 of the ferrule, can be set (FIG. 19). It is preferred that the crimping process works in such a way, and/or the anticollision lug 322 is formed in such a way, that in the mounting state M of the ferrule 20 the anticollision lug has been biased into a corresponding impedance compensating means 318. As shown in FIG. 18, a ferrule 20 is provided without a fixing hook 306, which can likewise be used in the case of all of the embodiments.

The ferrule 20 may be formed such that a self-locking of the ferrule 20 can be formed or is formed by means of the anticollision lug 322 and with a corresponding means of the ferrule, for example a means that partly complements it. For example, the anticollision lug 322 may be formed in such a way that it is locked in the mounting state M and/or compressed mounting state kM, for example for larger cable diameters, with a latching means of the flank 21, the latching means 310 or on/in the impedance compensating means 318. In particular, in such embodiments, the anticollision lug 322 may be locked with the flank 21 in the compressed mounting state kM.

By means of the self-locking 201, 202, 300, springing back of the ferrule 20, preferably produced from a stainless steel, or the flanks 21, 22 during cable mounting is prevented. According to the invention, the ferrule 20 does not have any stub crimping wings designed to butt against one another in the circumferential direction Ur for assuming a function as a "supporting sleeve", as the ferrule is designed for different cable types or cable sizes. With respect to comparable, conventional ferrules, it is preferred to reduce the ferrule 20 in its material thickness to about 20% to 35%, in particular to about 30%, to compensate for the material overlapping in the freewheel 310. This material overlapping also prevents braided strands from being pulled into a crimping seam of the ferrule 20 during production of pre-assembled cables. The material of the ferrule 20 preferably has a high tensile strength for assuming the function as a supporting sleeve.

Embodiments of the present disclosure make it possible for different cable sizes or cable types to fit into existing shielding contact sleeves. With such different cables, a conventional ferrule could not always be closed, and consequently preassembly through to the end product could not be guaranteed. The ferrule 20 according to the invention can be crimped over such cable diameters (smaller to larger, in particular smaller). As the crimping diameter or the crimping height of a shielding contact sleeve to be mounted thereafter defines the electrical performance of an end product and, for example, guarantees a good fit in a contact chamber in a housing, preassembly of the cable through to the functional end product is possible. The invention makes it possible to process, in particular to crimp, a range of diameters of cables with the same component parts.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical ferrule for an electrical cable, comprising:

a body defining a circumferential center portion connecting a first flank and a second flank, the first and second flanks arranged opposite one another in a radial direction of the ferrule; and at least one latch defined on at least one of the flanks for selectively fixing the flanks together and closing the ferrule in a latched state, the first and second flanks are moveable relative to one another in only one circumferential direction in the latched state, the flanks are repositionable from the latched state to decrease a diameter of the ferrule, free ends of the flanks overlap one another in the radial direction extending outward from a center of the ferrule in the latched state.

2. The electrical ferrule according to claim 1, wherein the latch includes a first hook extending radially outward from the first flank and a second hook extending radially inward from the second flange, the first and second hooks engaged with one another in the latched state of the ferrule.

3. The electrical ferrule according to claim 2, further comprising a passage formed in at least one of the first or second flanks and adjacent to at least one of the first or second hooks, the passage extending in the circumferential direction and receiving the other one of the first or second hooks as the diameter of the ferrule is decreased from that of the latched state.

4. The electrical ferrule according to claim 3, wherein each of the first and second flanks includes a respective first and second passage formed adjacent to the first and second hooks.

5. The electrical ferrule according to claim 4, wherein the first and second hooks are formed from an edge of a respective one of the first and second passages.

6. The electrical ferrule according to claim 4, further comprising a central passage formed in the center portion of the body.

7. The electrical ferrule according to claim 6, further comprising at least one fixing hook extending radially inward from an edge of the central passage.

8. The electrical ferrule according to claim 7, wherein a plurality of fixing hooks extend radially inward from each of a plurality of corners of the central passage.

9. The electrical ferrule according to claim 1, wherein the center section has a smaller radius of curvature than a radius of curvature of the first and second flanks in an open state of the ferrule.

10. The electrical ferrule according to claim 1, further comprising a stiffening bead formed on the body in the circumferential direction.

11. An electrical connecting device for connecting to an electrical cable, comprising:

an inner electrical terminal connecting to an inner conductor of the electrical cable;

a ferrule fitted over an outer conductor of the electrical cable, the ferrule including:

a body defining a circumferential center portion connecting a first flank and a second flank, the first and second flanks arranged opposite one another in a radial direction of the ferrule; and at least one latch defined on at least one of the first or second flanks, the latch selectively fixing the flanks together and closing the ferrule in a latched state, the maximum diameter of the ferrule is fixed and the flanks are free to move relative to one another in a circumferential direction in the latched state resulting in the decrease in the diameter of the ferrule, free ends of the flanks overlap one another in the radial direction extending outward from a center of the ferrule in the latched state; and an outer electrical terminal inserted over the ferrule after the ferrule has been fitted onto the outer conductor of the electrical cable.

12. An electrical ferrule for an electrical cable, comprising:

a body defining a circumferential center portion connecting a first flank and a second flank, the first and second flanks arranged opposite one another in a radial direction of the ferrule; and at least one latch including a latching projection on the first flank and at least two latching recesses on the second flank, each latching recess adapted to receive the latching projection to fix the flanks together and close the ferrule in a latched state in two different diameters of the ferrule, the latch prevents relative movement between the flanks in two circumferential directions in the latched state.

13. The electrical ferrule according to claim 12, wherein the at least two latching recesses merge uninterruptedly into one another.

* * * * *